United States Patent [19]

Rumbol

[11] Patent Number: 5,074,523

[45] Date of Patent: Dec. 24, 1991

[54] DEVICE

[75] Inventor: Edwin V. Rumbol, Brentwood, United Kingdom

[73] Assignee: Glaxo Group Limited, London, England

[21] Appl. No.: 423,874

[22] Filed: Oct. 19, 1989

[30] Foreign Application Priority Data

Oct. 20, 1988 [GB] United Kingdom ................. 8824596

[51] Int. Cl.[5] ................................ F16K 51/00

[52] U.S. Cl. ....................... 251/144; 251/56; 251/258; 251/259

[58] Field of Search .................. 251/252, 56, 58, 63.5, 251/229, 144, 324, 258, 259

[56] References Cited

U.S. PATENT DOCUMENTS

| | | | |
|---|---|---|---|
| 2,028,815 | 1/1936 | Wood | 251/252 |
| 2,301,378 | 11/1942 | Crista | 251/215 |
| 2,703,584 | 3/1955 | Mix | 251/252 |
| 2,838,290 | 6/1958 | Simpson | 251/324 |
| 3,367,365 | 2/1968 | Stevens | 251/229 |
| 4,120,479 | 10/1978 | Thompson et al. | 251/229 |
| 4,436,280 | 3/1984 | Geisow | 251/252 |
| 4,504,038 | 3/1985 | King | 251/58 |
| 4,858,641 | 8/1989 | Titus | 251/229 |

FOREIGN PATENT DOCUMENTS

| | | | |
|---|---|---|---|
| 602350 | 7/1960 | Canada | 251/56 |
| 916807 | 7/1954 | Fed. Rep. of Germany | 251/252 |
| 2062871 | 7/1971 | Fed. Rep. of Germany | 251/252 |
| 806485 | 12/1958 | United Kingdom . | |
| 2125942 | 3/1984 | United Kingdom | 137/872 |

*Primary Examiner*—A. Michael Chambers
*Attorney, Agent, or Firm*—Darby & Darby

[57] ABSTRACT

The application describes a valve device which can be used to open and shut a laterally arranged inlet in an inclined wall of a mixer granulator and which can be used in an automatic operation. The valve device comprises a main body (1) and a piston (2), the piston being movable between a retracted position and an advanced position. The piston (2) comprises a face (3) at its forward end which is inclined to the direction of movement and the device comprises means (24,19) to rotate the piston as it advances and retracts. Thus, the face of the piston can open and close an opening in a wall which extends in a direction at an angle to the said direction of movement of the piston.

8 Claims, 3 Drawing Sheets

DEVICE

BACKGROUND OF THE INVENTION

The present invention relates to a valve device, in particular a valve device for controlling access to a container with an inclined wall.

In the production of pharmaceutical tablets, for example, it is necessary to periodically introduce the component materials into a mixer granulator. Typically, the mixer granulator comprises a generally cylindrical bowl with a lid which has the same diameter as the bowl and is fitted with air filters.

Conventionally, it has been necessary to manually open and shut the lid of the bowl when fresh material needs to be fed to the mixer granulator. This makes continuous feeding difficult and allows the material to come into contact with the ambient atmosphere. A known mixing or granulating apparatus having a disc valve is disclosed in GB-A-2091625. Also, GB-A-2100610 shows a known mixer-granulator drier having a slide valve.

SUMMARY OF THE INVENTION

One aim of the present invention is to provide a valve device which can be used to open and shut a laterally arranged inlet in an inclined wall of a mixer granulator and which can be used in an automatic operation. However, the device of the invention can also be used in many other situations.

According to the invention there is provided a valve device comprising a main body and a piston, the piston being movable between a retracted position and an advanced position, wherein the piston comprises a face at its forward end which is inclined to the direction of movement and wherein the device comprises means to rotate the piston as it advances and retracts, whereby the face of the piston can adopt a different orientation in its advanced position than in its retracted position.

Thus the face of the piston can open and close an opening in a wall which extends in a direction at an angle to the said direction of movement of the piston.

The invention also concerns a combination of a valve device as defined above and a container.

The valve device of the invention allows automatic and continuous feeding of materials in a sealed system. Other advantages will be apparent from the detailed description.

BRIEF DESCRIPTION OF THE DRAWINGS

A preferred embodiment of the invention is described below, by example only, with reference to the accompanying drawings, wherein.

DETAILED DESCRIPTION

Figure 1:
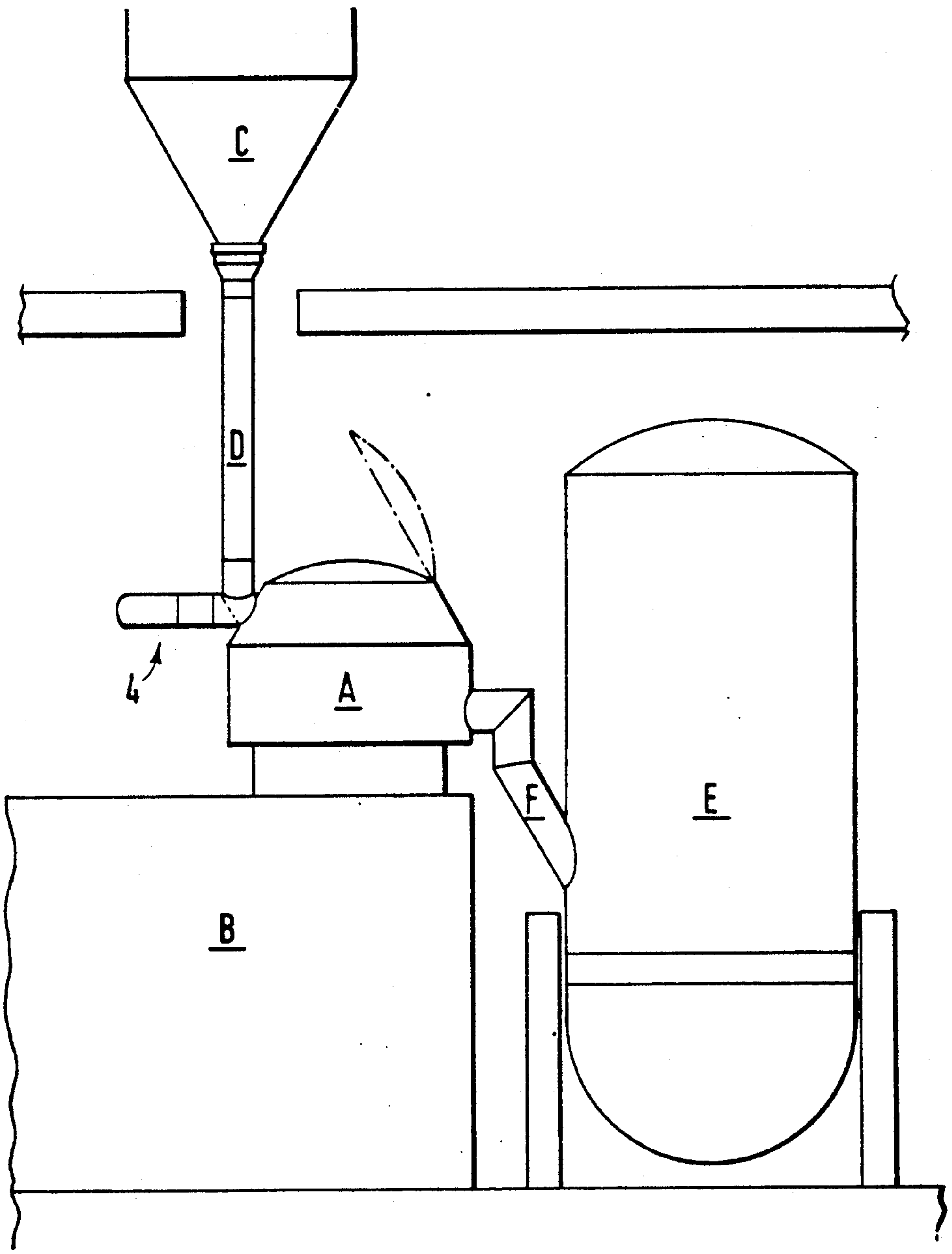
FIG. 1 is a schematic elevational view showing the valve device fitted to a mixer granulator.

The schematic view of FIG. 1 shows a mixer granulator A mounted on a table B. Material can be fed to the mixer granulator A from a hopper C via a chute D. Mixed material is taken from the mixer granulator A to a fluid bed drier E via chute F. Valve device 4 is mounted at the base of chute D.

Figure 2:
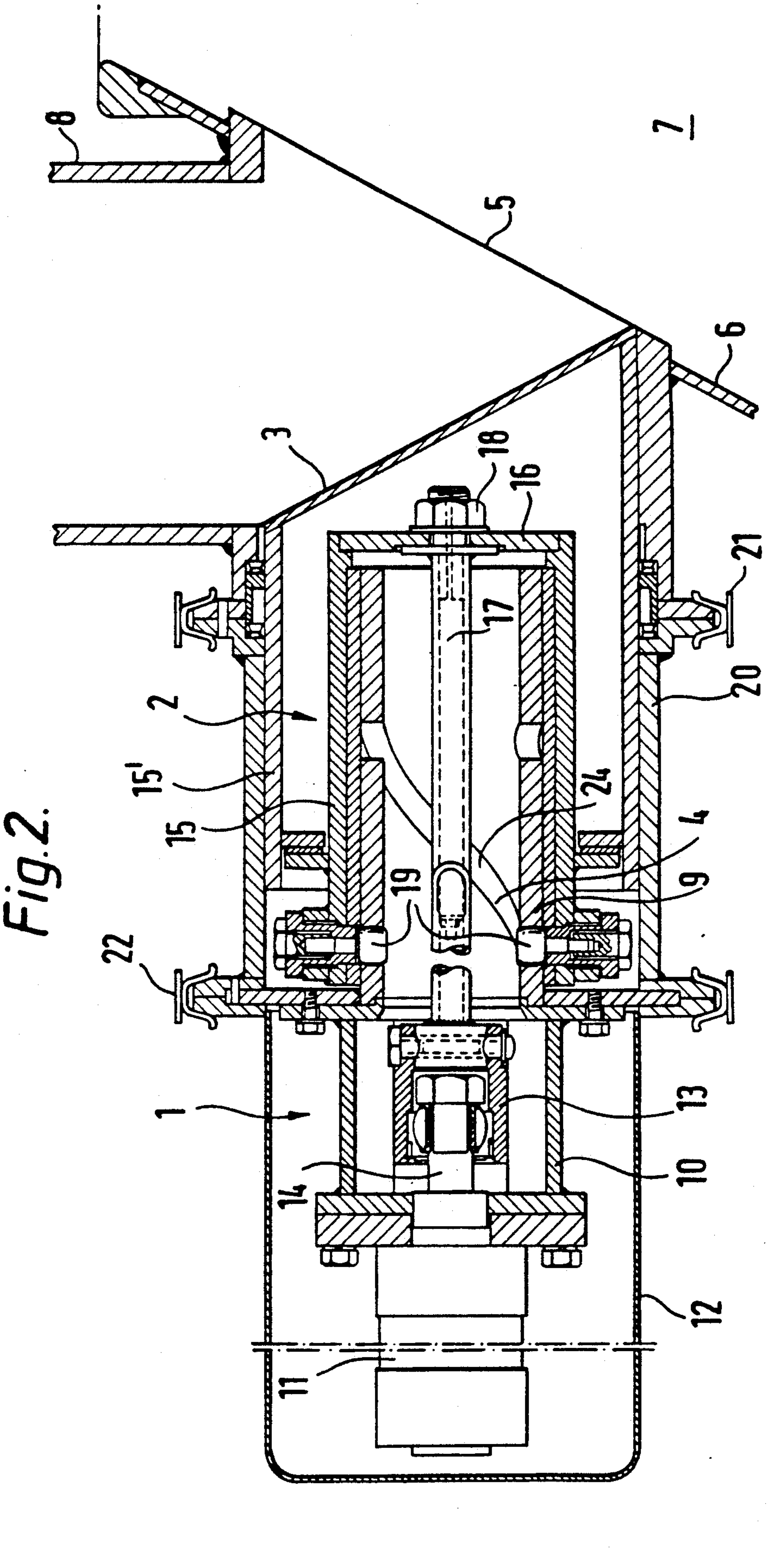
FIG. 2 is a sectional view of a valve device with the piston in its retracted position.
Figure 3:
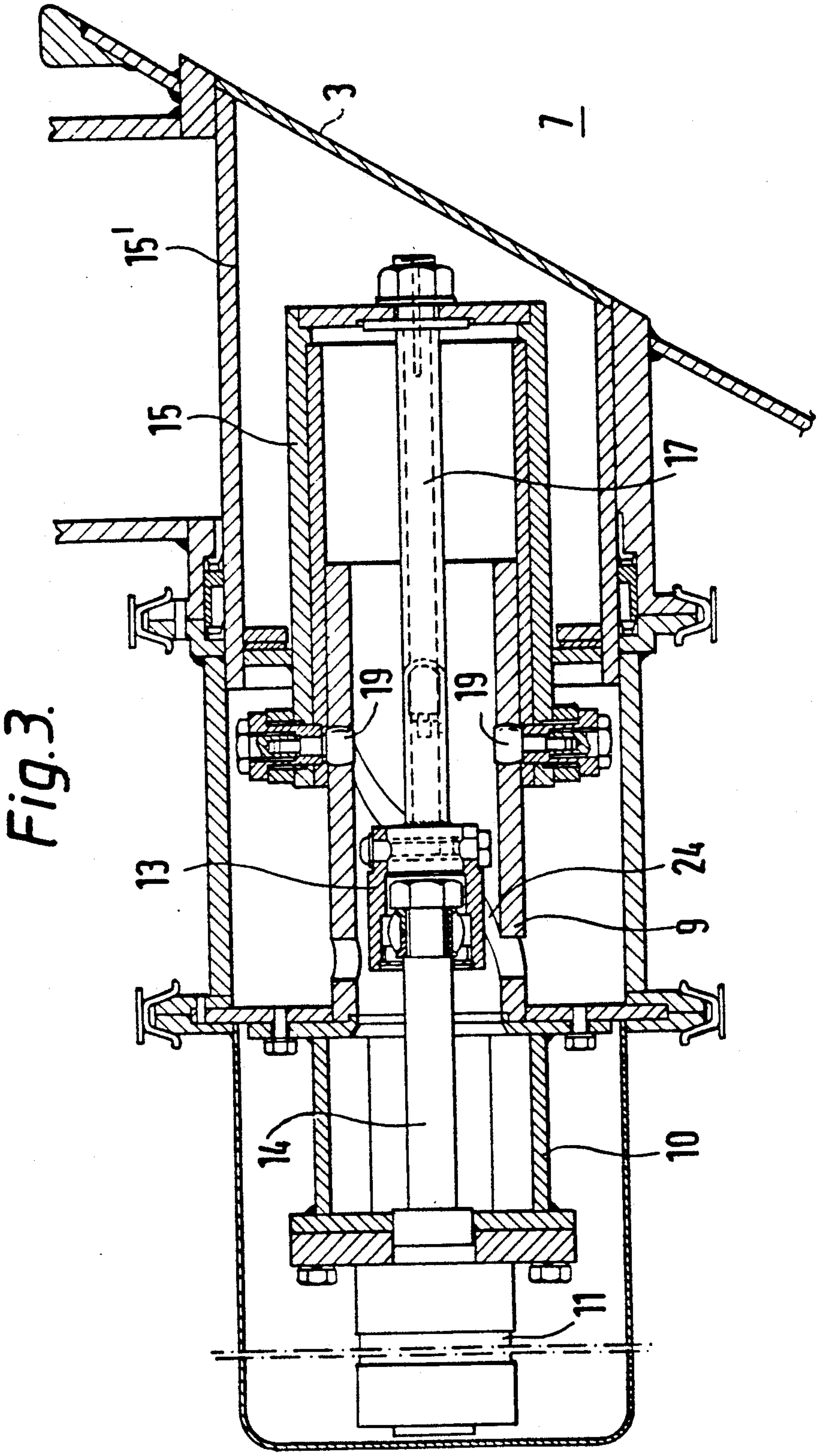
FIG. 3 is a view, similar to FIG. 2, but with the piston in its advanced position.

The valve device G illustrated in FIGS. 2 and 3 comprises a main body generally designated by the reference numeral 1 and a piston designated by the reference numeral 2. The piston 2 is movable between a retracted position shown in FIG. 2 and an advanced position shown in FIG. 3.

The piston 2 has at its forward end a face 3 which is inclined to the direction of movement of the piston. The valve device includes means 4 to rotate the piston as it moves between its retracted and advanced positions.

The advancement and rotation of the piston 2 allows the face 3 to adopt a forward position in which it can close an opening 5 in a wall 6 which itself is inclined to the direction of movement of the piston, here inclined through approximately 60°.

In the illustrated embodiment, the inclined wall 6 is the upper part of the side wall of a mixer granulator bowl 7. The valve device is arranged in a generally horizontal orientation at the base of a vertical chimney 8, which may correspond to chute D in FIG. 1 and which feeds the bowl 7.

The main body 1 of the valve device comprises cylindrical piston support 9 and a bearing housing 10. Mounted behind the housing 10 is an air cylinder 11, surrounded by an end cover 12. A PTFE-coated steel bearing 13 is located within housing 10, and a reciprocating thrust rod 14 extends rearwardly from the bearing 13 to the air cylinder 11, by which it is controlled. The air cylinder 11 contains a piston (not shown) which is driven by air pressure in a conventional manner.

The piston 2 comprises a pair of concentric cylinders 15, 15′ fixedly connected together, the above mentioned face 3 closing the forward end of the outer cylinder 15′ at an angle of 60°. The face 3 is thus oval-shaped. The inner cylinder 15 is movably mounted on the piston support 9 and is closed at its forward end by an end plate 16.

Thrust rod 17 is connected to the end plate 16 by a locking nut 18 and extends rearwardly within the piston support 9 to the bearing housing 10 where it is fixed to the bearing 13 and thus to the thrust rod 14. Rollers 19 are fixed at the rear end of the inner cylinder 15, on opposite sides thereof, and these rollers locate in spiral grooves 24 in the piston support 9, these grooves and rollers forming the above mentioned rotating means 4.

The valve device is housed within a cylindrical member 20 which is fitted to the base of the chimney 8 via clamps 21. The member 20 is also connected to the end cover 12 by clamps 22. These clamps can be easily undone to allow easy access to the valve device if necessary.

Upon supply to the air cylinder of air under pressure, thrust rods 14, 17 and thus the cylinders 15, 15′ are forced forwards along piston support 9. The rollers 19 moving along the spiral grooves 24 cause the rod 17 and the cylinders 15, 15′ to rotate on the bearing 13 as the piston advances. The advanced position of the piston is shown in FIG. 3, wherein the opening 5 in the wall 6 of the bowl is closed by the face 3 of the piston 2.

The face 3 is advantageously made from sintered stainless steel which allows the passage of air therethrough. That is the face 3 is porous at least to air flow. Thus, when compressed air is fed to the chamber between cylinders 15 and 15′ via the hollow thrust rod 17 and via air lines (not shown), the air can fluidise the powder to assist the flow into the bowl.

As clearly seen in FIG. 2 the valve device is mounted at the base of the chimney 8 so that the leading edge of the piston, in its retracted position, is at the bottom and almost enters the opening 5. The trailing edge of the face 3 is at the top and is flush with the wall of the chimney 8. The inclination of the face 3 is chosen to be the same as that of the wall 6 of the bowl, but on the opposite side of the vertical, and the spiral grooves 24 extend around 180° and to a length equal to a horizontal distance between the top and bottom edges of the opening 5. Accordingly, by its forward movement, the piston rotates from a position completely free of the opening to a position completely closing that opening. The piston is reversed to the position in FIG. 2 by means of the air cylinder. It should be noted that in the retracted position of the piston, the end face which is inclined to the vertical serves to direct any material coming down the chimney into the bowl, and for this purpose the angle of inclination should be at least 60°.

The valve device of the invention is well adapted to an automatic system in which the operation of the mixer granulator is linked to the feed of material to the bowl, the valve device intermittently freeing the opening in the bowl to coincide with the mixer granulator being emptied and fresh material being fed in. The feeding of the mixer granulator can thus be achieved in an entirely sealed and sterile manner which is important when pharmaceuticals are being handled.

The inclined face of the piston can provide a flush internal finish to the inside wall of the bowl. This ensures that no unmixed material is left in the entry port between filling cycles. The side-fitting valve also allows the main lid at the top of the bowl to be opened in emergencies without having to remove any feed pipes.

It should be noted that the bowl could be fitted with two or more valve devices if different materials are fed separately to the mixer granulator, rather than a predetermined blend of materials.

The valve device need not be fitted in a horizontal position. The valve can be used to control the flow of powders under pressure or liquid under pressure, and in these instances the device could be used in any orientation desired. If pressurized powders or fluids are being fed, the valve would need little modification other than the provision of seals for the piston. It should be noted, however, that in such circumstances the angle of inclination of the end face of the valve may be much less than the 60° mentioned above in connection with powders.

What I claim is:

1. A container having an inclined wall, an inlet opening in said inclined wall, a substantially vertical inlet chute communicating with said inlet opening, and a valve device for opening and closing said inlet opening of said container, wherein the valve device comprises a piston which is movable between a retracted position and an advanced position, the piston having a face at its forward end which is inclined to the direction of movement of the piston, wherein the valve device further comprises a rotating means to rotate the piston as it advances and retracts, said piston being arranged in a substantially horizontal position, whereby the inclined face of the piston, in its advanced position, closes the inlet opening of the container and, in its retracted position, adopts a different orientation and is capable of deflecting material flowing down the inlet chute sideways into the container.

2. A container as in claim 1, and a mixer/granulating machine, and means connecting said container with said mixer/granulating machine whereby said container operates as a bowl in connection with said mixer/granulating machine.

3. A device according to claim 1, wherein the piston is substantially cylindrical and is mounted on a cylindrical part of the main body the rotating means comprising spiral grooves in the said cylindrical part or the piston and keys fitted on the piston or cylindrical part respectively.

4. A device according to claim 3, wherein the spiral grooves extend around 180°.

5. A device according to claim 4, wherein the angle of inclination of the face of the piston is substantially 60°.

6. A device according to claim 5, wherein the face of the piston is porous.

7. A device according to claim 1, wherein the piston is advanced and retracted by means of air pressure.

8. A container having an inclined wall, an inlet opening in said inclined wall, a substantially vertical inlet chute communicating with said inlet opening, and a valve device for opening and closing said inlet opening of said container, wherein the valve device comprises a piston which is movable between a retracted position and an advanced position, the piston having a face at its forward end which is inclined to the direction of movement of the piston, said valve device further comprising rotating means to rotate the piston as it advances and retracts, said piston being arranged in a substantially horizontal position, whereby the inclined face of the piston, in its advanced position, closes the inlet of the container and, in its retracted position, adopts a different orientation to form an inclined wall of said inlet chute extending to said inlet opening to provide a path for material flowing down the inlet chute directly to said inlet opening.

* * * * *